C. F. BURGESS.
SHIPPING AND STORING DRY BATTERIES.
APPLICATION FILED MAR. 29, 1917.
1,280,657.
Patented Oct. 8, 1918.
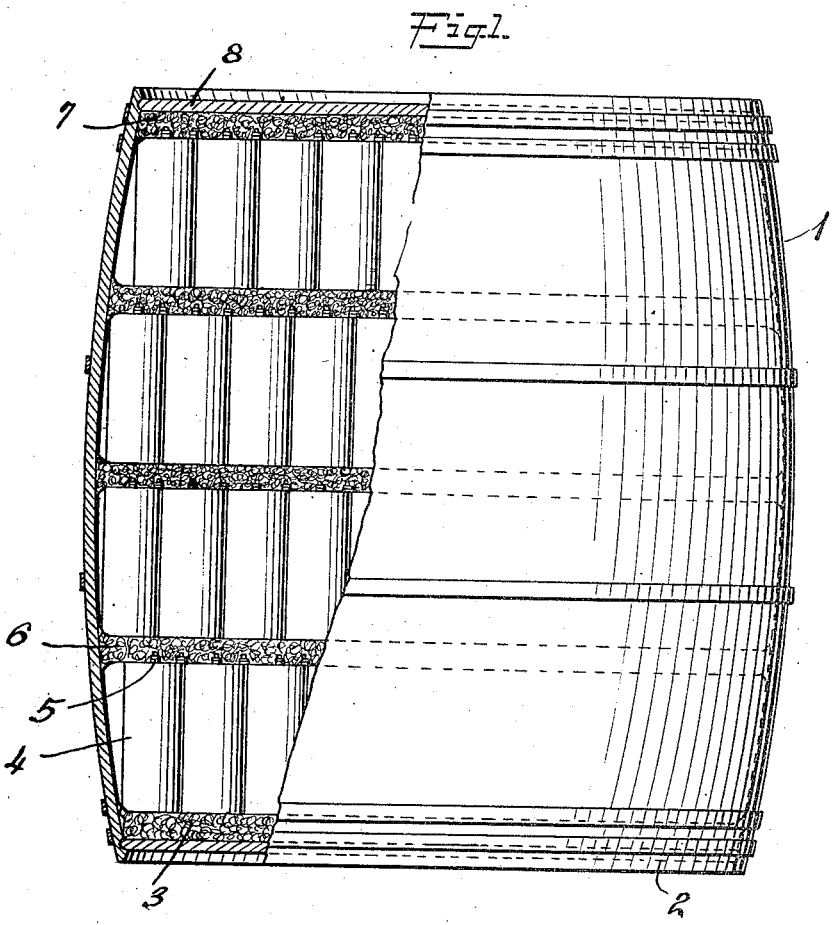
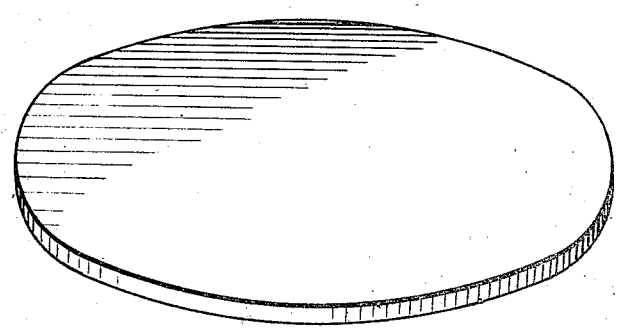
Inventor
Charles F. Burgess
By Tomlie Davis Marvin & Edmonds
Attorney

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

SHIPPING AND STORING DRY BATTERIES.

1,280,657.  Specification of Letters Patent.  Patented Oct. 8, 1918.

Application filed March 29, 1917. Serial No. 158,164.

*To all whom it may concern:*

Be it known that I, CHARLES F. BURGESS, a citizen of the United States, residing at Madison, in the county of Dane and State of Wisconsin, have invented certain new and useful Improvements in Shipping and Storing Dry Batteries; and I do hereby declare the following to be a full, clear, and exact description of the invention, such as will enable others skilled in the art to which it appertains to make and use the same.

In the shipment of dry batteries it is customary to pack them in ordinary wooden barrels using straw or hay as packing material. As the result, the batteries are likely to shift about in the packing and very often get in contact with one another, and so are short-circuited and ruined. The short-circuited dry battery is likely to have its zinc container used up to the extent that perforations will form and the semi-fluid electrolyte leak out and spoil the appearance of adjacent cells. Also, this short-circuiting increases the fire hazard. If the straw is damp enough to form an effective packing, it is likely to deface the pasteboard cartons or their labels, and if the straw is thoroughly dry, it does not hold the batteries firmly in position, but allows them to shift about as the barrel is rolled or pitched end over end. Furthermore, the straw is a nuisance around the retailer's store when he unpacks the barrel.

It is an object of the present invention to provide a package of dry batteries which can be shipped or placed in storage without danger of short-circuiting the batteries or impairing in any way their appearance or utility, the arrangement being such as to avoid any litter when the barrel is opened.

Other objects and advantages will become clear from the following description, which is to be taken in conjunction with the accompanying drawings, wherein—

Figure 1 is an elevation of the complete package, a part of the wall of the container being broken away to show how the dry batteries are arranged therein; and Fig. 2 is a perspective view of one of the circular disks of insulating material used to cover each layer of dry batteries.

In the embodiment illustrated, the package comprises an ordinary wooden barrel or equivalent container 1, having a wooden bottom 2 of usual character, on which is placed a disk 3 of yielding insulating material. Preferably the disk is cut to fit snugly within the barrel at this point, and in the preferred embodiment, the disk is about three-quarters of an inch thick and consists of flax fibers felted into sheets such, for instance, as the product known to the building trade as "flaxlinum," and used by builders for interlining houses. Sheets of this material may be readily cut to the form of disks of an appropriate size for the purpose here described. On this bottom disk 3 I arrange a layer of dry batteries 4, packing them together side by side with their projecting terminals 5 uppermost, and over the top of the layer of dry batteries thus arranged, I place a disk 6 of "flax-linum," this disk being of somewhat larger diameter than disk 3 because of the bulge in the barrel. In similar manner I pack the barrel with other layers superimposed one above another with disks of the yielding insulating material separating the layers. The projecting terminals of the dry batteries embed themselves in the highly porous and yielding flax fiber disks which, in a sense, anchor the batteries against shifting about and at the same time insulate the terminals and prevent inadvertent short-circuiting with its attendant risk and inconvenience. Four layers of dry batteries are sufficient for a wooden barrel of appropriate size, and after putting in the topmost layer of batteries, and its insulating and anchoring disk 7, the wooden head 8 of the barrel may be forced into place and secured with nails and hoops in the usual manner. Throughout the barrel the several disks can with advantage be made to fit snugly, and consequently the middle disk is of larger diameter than the others, but as the sheets are flexible, there is no difficulty in introducing them through the open end of the barrel when the barrel is being packed, or withdrawing them therefrom when the barrel is being unpacked.

The retail merchant into whose store such a package of dry batteries may come can gain access to the dry batteries by merely taking off the barrel cover 8 and the adjacent pad 7, and then has the topmost layer of dry batteries fully exposed for inspection or sale. These can be taken from the barrel as fast as they may be needed, and as soon as the topmost layer has been exhausted, the second pad can be withdrawn very conveniently and the second layer thereby exposed, and so on down through the entire package. The resultant freedom from litter in the retailer's store is one of the important advantages of the present package.

I claim:—

1. A package of dry batteries, comprising in combination, a barrel, dry batteries arranged therein in layers, which rest on one another, and disks of yielding insulating material separating said layers and in which the projecting terminals of the dry batteries are embedded by the weight of the material above, to anchor said batteries and insulate the terimnals, substantially as described.

2. A package of dry batteries, comprising in combination, a barrel, dry batteries arranged therein in layers, and felted flax fiber disks separating said layers and wherein the projecting terminals of the dry batteries are embedded and anchored, substantially as described.

3. A package of dry batteries, comprising in combination a barrel, dry batteries arranged therein in superimposed layers, flexible disks of insulating, fibrous material separating said layers, said disks fitting snugly against the inside walls of the barrel, with the projecting terminals of the batteries embedded in the disks and insulated and anchored thereby.

In testimony whereof I affix my signature.

CHARLES F. BURGESS